Sept. 22, 1936. F. L. DARLING 2,054,897
CONTAINER AND CLOSURE THEREFOR
Filed Dec. 8, 1933
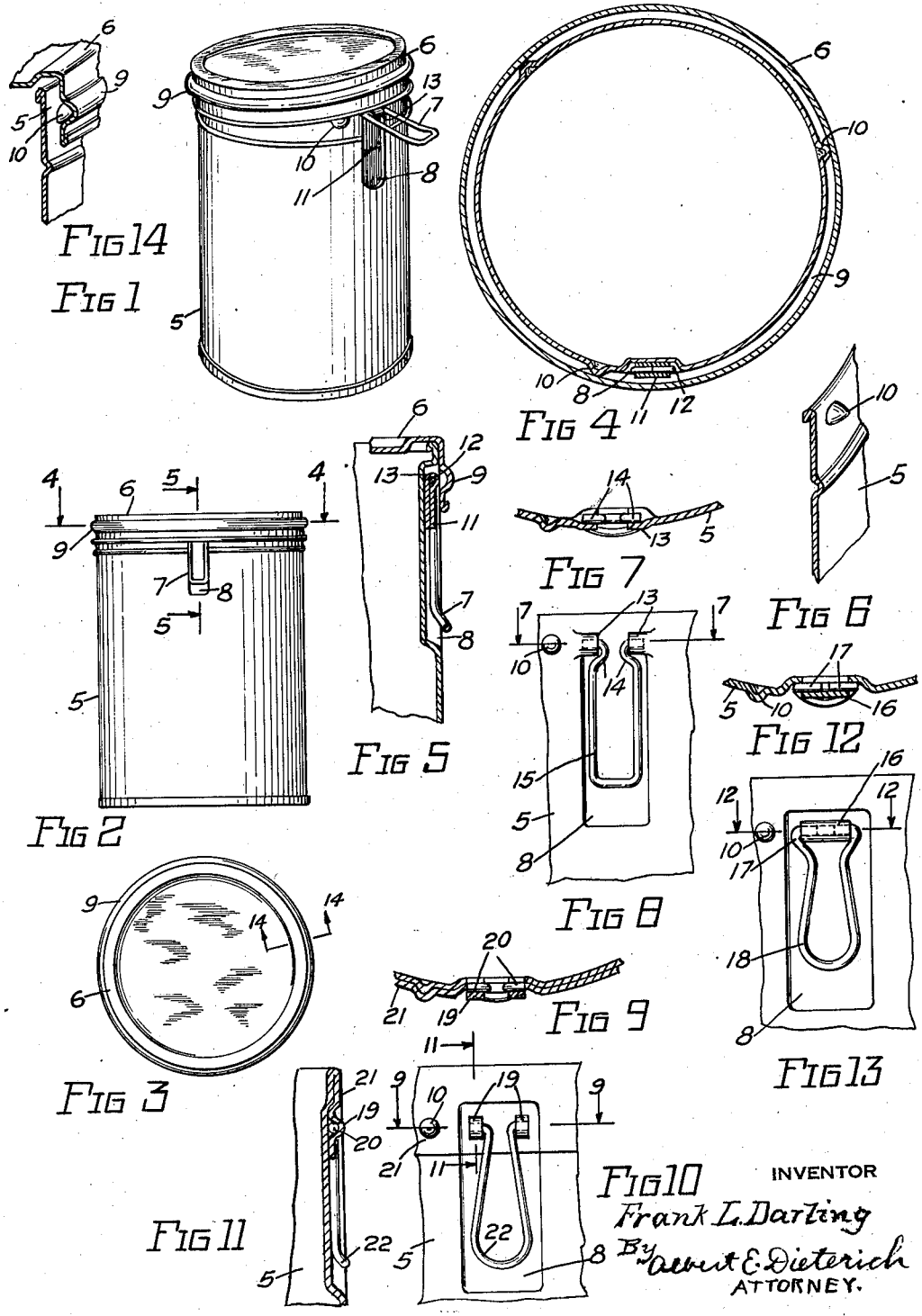
INVENTOR
Frank L. Darling
By Albert E. Dieterich
ATTORNEY.

Patented Sept. 22, 1936

2,054,897

UNITED STATES PATENT OFFICE 2,054,897

CONTAINER AND CLOSURE THEREFOR

Frank L. Darling, Forest Hills, N. Y., assignor, by mesne assignments, to Crown Cork & Seal Company, Inc., a corporation of New York Application December 8, 1933, Serial No. 701,526

2 Claims. (Cl. 220—43)

This invention relates to improvements in a combined container and closure, and one of its objects is to provide a container with a slip cover which interlocks therewith to hold the same in sealed position, and to also provide an opening or releasing member, with which the cover may be lifted from interlocking engagement with the container.

A further object of the invention is the provision of a container with a cover lifting element, pivotally mounted on the wall of the container and adapted to be retained in normal folded position snugly against the container, by the overlapping engagement of the slip cover with the container.

A still further object of the invention is the provision of a particular interlocking connection between a container and a slip cover therefor, which will hold the cover in sealed position on the container against accidental displacement, but which can be operated to spring the cover by a single tool insertion between the pendant flange of the cover and the wall of the cover, so that the cover may be readily removed.

A still further object of the invention is the provision of a container having its wall formed with a recess, in which a pivoted lifting element is mounted, so as to be normally held in nested position within the recess, when the slip cover is in position on the container.

A still further object of the invention is the provision of container having a plurality of external projections or buttons formed on the rim of its wall, spaced equal distances apart, a slip cover having its pendant flange formed with an encircling bead which receives all of the projections or buttons, and a device located adjacent to one of the projections on the rim of the container, which is normally retained in inoperative position by the overlapping action of the cover flange, and which may be operated by the customer or user of the container, to disengage the beaded flange of the cover from the adjacent projection or bead, so that the cover will readily slip from the remaining projections, beads or buttons.

A still further object of the invention is the provision of a simple and inexpensive mounting for the lifting device.

With the above and other objects in view the invention consists in certain new and useful constructions, combinations, and arrangements of parts, clearly described in the specification following, and fully illustrated in the drawing, in which:

Fig. 1 is a perspective view, showing the cover in sealed position on the container.

Fig. 2 is a front view thereof.

Fig. 3 is a top plan view thereof.

Fig. 4 is a horizontal sectional view, taken on line 4—4 of Fig. 2, looking in the direction of the arrows.

Fig. 5 is a detail vertical sectional view, taken on line 5—5 of Fig. 2, looking in the direction of the arrows.

Fig. 6 is a detail perspective view, in section, of a portion of the cover.

Fig. 7 is a detail side elevation thereof.

Fig. 8 is a detail side elevation thereof.

Fig. 9 is a detail horizontal sectional view, taken on line 9—9 of Fig. 10, looking in the direction of the arrows.

Fig. 10 is a detail front elevation thereof.

Fig. 11 is a detail vertical sectional view, taken on line 11—11 of Fig. 10, looking in the direction of the arrows.

Fig. 12 is a detail sectional view, taken on line 12—12 of Fig. 13, looking in the direction of the arrows.

Fig. 13 is a detail front elevation thereof.

Figure 14 is a detail perspective view of a portion of the can and cover showing the cooperative relation between the parts 9 and 10.

Referring to the drawing 5 designates a container or vessel, which includes an upright wall and the usual base, and which may be formed of any suitable material. In this case the container or vessel is shown to be formed of thin metal, and the bottom 5a is shown to be suitably seamed on the wall of the container.

The container wall may be formed with a stiffening bead 5b, and a rolled edge 5c. The rim of the container wall is formed with a plurality of extruded projections, beads or buttons 10, which are shown to be spaced apart equal distances. The best results are obtained by using semi-spherical external projections or beads, three in number, spaced 120 degrees from each other, and located in a common transverse plane of the container. Due to the thin metal from which the container wall is formed it will have a certain flexibility, which will permit portions of the wall to be forced out of normal position, so that by forcibly deforming the flexible wall of the container one or more of the projections may be forced out of its normal arcuate relation to the other projections or beads.

A portion of the flexible wall of the container is formed with a longitudinal recess 8, and a lifting device, in the form of a U-shaped wire lever 7, having opposed angularly disposed terminals or pivoting ends 7a and 7b, is mounted for swinging movement in this recess, by means of the hinge or bearing member 11, which consists of a narrow strip of thin metal bent upon itself to provide a retaining eye which receives the pivoting ends 7a and 7b. This strip is then attached in place within the upper end of the recess 8 by means of spot welding or like fastening means, the upper end or hinge eye thus provided being located slightly below the upper edge of the wall of the container. The upper end of the recess does not extend to the upper edge of the container wall, and the lower end of the lever 7 is deflected slightly outwardly, to provide an easily pickable portion, whereby the finger of the user, or any suitable narrow tool, may be placed under the lever, or between it and the can or container wall.

The major portion of the lever, especially adjacent the rim of the container wall, lies wholly within the plane of the recess, so that it offers no additional resistance to the mounting of the cover 6 thereon. The cover is formed with a pendant flange 9 having an external beaded portion or groove 9a formed therein, which is shown to extend completely around the circular flange of the cover. The lower edge of the cover flange may be rolled or otherwise finished, to stiffen it.

The pendant flange of the cover overlaps the pivoted end of the lever, in its normal sealed position, so that the lever is retained in its nested position within the recess, and the upper end of the lever arm will be contiguous to the rolled or stiffened lower edge of the cover flange or skirt.

In its sealed position on the container wall, the flange of the cover will be interlocked with the container wall, because the external projections or buttons 10 of the container wall will project into the beaded groove 9a of the cover flange. These projections extend outwardly of the rolled or stiffened edge of the cover, so that it is necessary to force the cover over the projections, in order to fully position the cover on the container. By applying manual pressure to the cover the projections of the container are forced inwardly, thus allowing the cover flange to move to sealing position, and also insuring that the projections of the rim of the container wall will snap into the groove 9a of the cover flange, thus interlocking the cover to the container, against accidental detachment, with resultant spilling of the container contents.

To remove the cover, the lower or outwardly deflected end of the pivoted lever is forced outwardly. This action will cause the upper end of the lever arm to slide against the adjacent portion of the rolled edge of the container cover, thereby producing a lifting effort upon the cover. At the same time the portion of the wall of the container which carries the lever will be forced inwardly, by reason of the resistance offered by the cover flange to the opening action of the lever, and due to this flexing of the cover wall, the adjacent projection or external button of the container wall will be forced inwardly to clear the groove 9a of the cover, thus permitting the cover to be forced upwardly so that this nearest projection no longer interlocks with the cover, when the cover may be readily lifted from the container wall. In order to maintain the normal cylindrical curvature of the container wall, it is formed with a stiffening beaded portion 5', located below the row of projections thereof. This serves to cause the container wall to spring back to its original cylindrical shape after being deformed by the opening action of the lever.

In Figs. 7 and 8 I show a modified form of the invention, with reference to the mounting of the lever. In these views the container wall is indicated at 5d, and the lever recess at 8a. The lever 15 is formed of wire shaped to provide a U-shaped form, thus providing side bars 15a and 15b, having outset terminals 14 which pivotally engage the struck out eyes or keepers 13, formed on the wall of the container.

In Figs. 9, 10 and 11 I show another modified form of the mounting of the opening lever, wherein the container wall 5e is formed with the recess 8b. The wall of the container is formed with a folded rim flange 21, which is spun or rolled against the external face of the container wall, and thus provides an integral rim band. The portion of this rim band 21 which crosses the recess 8b is also indented to form a part of the recess, and is provided with opposed struck-out pivot eyes 19, which receive the pivot ends 20 of the U-shaped wire lever 22.

In Figs. 12 and 13 I show another modified form of the mounting of the lever. In this figure the container wall 5f is formed with the recess 8c, and the indented wall of this recess is formed with a struck out hinge eye 16, which receives the inturned pivot ends 17 of the wire lever 18.

The invention provides a simple, inexpensive, and practical means for interlocking covers to containers, and of forcibly opening the covers, without mutilating either the containers or their covers.

The lifting or opening device remains in nested, inoperative position, when the cover is sealed on the can, and does not increase the external diameter of the container. In mounting the cover on the container the opening lever is forced back into its recess or pocket, and the design of both this recess and the opening lever is such, that no resistance is offered by these parts to the mounting of the cover on the container wall. Accidental spilling of the contents is avoided.

This application embodies certain improvements over my prior Patents, 1,664,595, and 1,777,077.

I claim as new and patentable:
1. The combination with a container having a wall formed with a vertical recess and provided with a set of projections located in a horizontal plane, one projection being located adjacent the vertical recess and the other projections being remote therefrom, a lid lifter pivotally held in said vertical recess with its pivotal axis in approximately the same horizontal plane as that containing the projections and a cover having a skirt with a horizontal groove to receive said projections, said skirt extending down over a substantial portion of said lifter.

2. The combination with a container having a wall formed with a vertical recess and provided with a set of projections located in a horizontal plane, one projection being located adjacent the vertical recess and the other projections being remote therefrom, a lid lifter pivotally held in said vertical recess with its pivotal axis in approximately the same horizontal plane as that containing the projections, and a cover having a skirt with a horizontal groove to receive said projections, said skirt extending down over a substantial portion of said lifter, said projections being three in number spaced approximately 120° apart.

FRANK L. DARLING.